UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS FOR OBTAINING SULPHUR COMPOUNDS FROM MINERAL OILS AND THE LIKE.

1,423,711.      Specification of Letters Patent.      Patented July 25, 1922.

No Drawing.      Application filed July 14, 1920. Serial No. 396,220.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes for Obtaining Sulphur Compounds from Mineral Oils and the like, of which the following is a specification.

This invention relates to the production of sulphur and sulphur compounds from material which, to the best of my knowledge, has not hitherto been considered as a profitable source of this element.

Many of the mineral oils, especially the crude oils found in Mexico and in certain parts of Texas, contain sulphur in objectionably appreciable quantities. In fact the sulphur content of some of the Mexican oils runs as high as five per cent by weight; and four per cent or more is very common.

When one considers that there may be a million pounds of sulphur present in the cargo of but a single oil tanker or steamer,— the enormous waste and loss of sulphur from this source becomes apparent. Furthermore, the sulphur deleteriously affects the oil, so that when the percentage of this element in the mineral oil is high, the oil is usually sold merely as crude product.

I have discovered, however, that much of this objectionable but otherwise very valuable ingredient may be economically recovered, with the consequent enhancement of the oil in value.

This discovery is based upon another which I have made, namely, that liquid ammonia is very freely miscible with crude oil and the distillates of such oil, e. g. kerosene and the like. In fact, if the mixture of oil and liquid ammonia be one of about 50 per cent by volume of each, the resultant volume of the mixture will be less than the sum of the volumes of its ingredients, owing to the dissolving of about 10 per cent of the liquid ammonia in the oil.

The liquid ammonia is preferably introduced under pressure into the bottom of a column of the oil to be treated, if the operation is conducted at room temperatures. A reaction then occurs which results in the formation of an ammonium sulphur compound.

The reaction takes place much more vigorously when a catalyst, such as sodium, potassium, barium, calcium, or a like alkalinous metal is present in solution in the liquid ammonia. Even a trace of metallic sodium, for example, causes the reaction to proceed quite vigorously.

The oil, containing the so formed sulphur compound, may then be substantially freed therefrom by washing it with water; as small a quantity as possible of water being preferably used in order to maintain the concentration of the sulphur bearing solution as high as possible.

I prefer to acidulate the water, as, for example, by means of sulfuric acid, in order to recover most of the residual ammonia, which is present in solution in the oil. The acid combines with the ammonia to form ammonium sulfate; so that the water containing the first formed sulphur compound, also contains dissolved ammonium sulfate.

If desired, the oil may be moderately heated before washing it with acidulated water, to volatilize or drive off a portion of its ammonia content.

The mixed solution of sulphur compounds may then be treated in various ways,—as, for example, by blowing ozonized air therethrough,—to convert the ammonium sulphur compound into ammonium sulfate, and the ammonium sulfate may then be crystallized out of the solution in an evaporator.

The ammonium sulphur compound (which is apparently complex) may also be oxidized to form ammonium sulfate through the agency of ammonium persulfate.

The ammonium sulfate produced, as aforesaid, may be used as fertilizer or it may be subjected to known treatment to obtain the sulphur therefrom in any desired form or compound.

My invention is by no means limited to the particular procedure above set forth; since, through the intermediacy of liquid ammonia, it is possible to recover sulphur from the oil in a variety of ways.

For example, if a substance be present which is soluble in liquid ammonia and which is also capable of reacting upon the sulphur contained in the oil when the ammonia is mixed with the oil, as aforesaid,— it is even possible to recover the sulphur quite directly in the form of ammonium sulfate.

I have discovered that ammonium persulfate is a substance of this character; this material being not only highly soluble in liquid ammonia, but being further capable of reacting with the sulphur present in the oil,—after the liquid ammonia has been mixed with the latter, preferably in substantially the same way and under the pressure and temperature conditions above referred to,—to directly form ammonium sulfate.

The mixture of oil and liquid ammonia, containing the thus formed ammonium sulfate, may now be washed with acidulated water; again, preferably using as little water as possible, to form a reasonably concentrated solution of the sulfate.

The ammonium sulfate may be recovered from this solution by crystallization.

If desired, the mixture of oil and liquid ammonia, aforesaid, can be warmed to drive off a portion of the ammonia before washing with water.

Also, I find it desirable to treat the oil, after it has been washed, with soda-lime, or like alkalinous material, to more completely liberate the ammonia held in solution or occluded in the oil.

All ammonia vapors are, of course, collected.

I may here remark that after the oil has been treated in the manner last aforesaid, it will be found to be substantially free from ammonia and ammonium persulfate.

With reference to the treatment of the oil with liquid ammonia containing sodium, or a like alkalinous metal, in the manner first described, I have found that normally substantially no sodium or the like is left in the oil after the washing operation has been completed. The sodium appears in the washwater in the form of a complex compound the exact nature of which I have not yet been able to ascertain. It appears to be in the nature of a mercaptan.

In any case, the advantage of using liquid ammonia as a mentruum or instrumentality, for effecting recovery of sulphur from mineral oils, whereby to effect such recovery at substantially room temperatures, or lower, and by the use of simple and relatively inexpensive apparatus; coupled with the great improvement attained thereby in the character of the oil,—will, it is believed, become at once apparent to those skilled in the art.

For the purpose of avoiding circumlocution, I employ the term "alkalinous metal" throughout the specification and claims to designate generally metals belonging to the alkali and alkali earth metal groups, the principal representatives of which metals have been particularly designated as being especially adapted for use in carrying out the described process.

By the term "mineral oil" as employed in the specification and claims I propose to designate broadly not only the crude oil before it has been subjected to refining operations, but such distillates and derivatives thereof as naturally lend themselves to treatment for removal of sulphur and sulphur compounds therefrom, including lubricating oils, kerosene, gasoline, and the like.

While the term "low temperature" is employed in the specification and claims to designate the temperature at which the purification of the oil is preferably effected, this term is used as indicating generally ordinary or room temperatures or lower as contradistinguished from the exceedingly high temperatures generally employed heretofore in the elimination of the sulphur content from sulphur bearing oils, and it is to be understood that my process herein described is not to be limited to use at subnormal temperatures but on the contrary may be carried out at such temperatures approximating ordinary or room temperature as will permit the maintainance of the anhydrous ammonia in liquid form.

Having thus described my invention, what I claim is:

1. A process for recovering sulphur from sulphur bearing mineral oil, which comprises effecting the removal of sulphur from said oil in the form of an ammonia-sulphur compound through the intermediacy of liquid ammonia.

2. A process for recovering sulphur from sulphur bearing mineral oil, which comprises effecting the removal of sulphur from said oil in the form of an ammonia-sulphur compound through the intermediacy of liquid ammonia under pressure.

3. A process for recovering sulphur from sulphur bearing mineral oil, which comprises treating said oil with liquid ammonia under pressure and in the presence of an oxidizing agent dissolved in said liquid ammonia which is capable of participating therewith in a reaction which yields a compound containing said sulphur.

4. A process for recovering sulphur from sulphur bearing mineral oil, which comprises treating said oil with liquid ammonia under pressure and containing in the presence of an oxidizing agent dissolved in said liquid ammonia which is capable of participating therewith in a reaction which yields a compound containing said sulphur, and separating said sulphur compound and liquid ammonia from said oil.

5. A process for recovering sulphur from sulphur bearing mineral oil, which comprises treating said oil with liquid ammonia under pressure and containing in the presence of an oxidizing agent dissolved in said liquid ammonia which is capable of participating therewith in a reaction which yields a compound containing said sulphur, and separating said sulphur compound and liquid ammonia from said oil by washing the latter with acidulated water.

6. A process for recovering sulphur from sulphur bearing mineral oil, which comprises treating said oil with liquid ammonia under pressure and in the presence of an oxidizing reagent dissolved in said liquid ammonia which is capable of participating therewith in a reaction which yields an oxygen compound containing said sulphur.

7. A process for recovering sulphur from sulphur bearing mineral oil, which comprises treating said oil with liquid ammonia under pressure and in the presence of an oxygen compound the base of which is alkalinous in character.

8. A process for recovering sulphur from sulphur bearing mineral oil, which comprises treating said oil with liquid ammonia under pressure and containing an oxidizing agent which is soluble in liquid ammonia.

9. A process for recovering sulphur from sulphur bearing mineral oil, which comprises treating said oil with liquid ammonia under pressure and containing an oxidizing agent which is soluble in liquid ammonia.

10. A process for recovering sulphur from sulphur bearing mineral oil, which comprises treating said oil with liquid ammonia under pressure and containing an oxidizing agent the base of which is alkalinous in character.

11. A process for recovering sulphur from sulphur bearing mineral oil, which comprises treating said oil with liquid ammonia under pressure and in the presence of ammonium persulfate.

12. The method of recovering sulphur from sulphur bearing mineral oil, which comprises effecting the removal of sulphur from said oil by an oxidation process conducted through the intermediacy of liquid ammonia.

13. The process of recovering sulphur from sulphur bearing mineral oil, which comprises effecting the removal of sulphur from said oil in the form of an ammonia-sulphur compound through the intermediacy of liquid ammonia acting in the presence of an oxidizing agent.

14. The process of recovering sulphur from sulphur bearing mineral oil, which comprises effecting the removal of sulphur from said oil in the form of an ammonia-sulphur compound through the intermediacy of ammonia acting in the presence of a catalyst.

15. The process of recovering sulphur from sulphur bearing mineral oil, which comprises, effecting the removal of sulphur from said oil in the form of an ammonia-sulphur compound through the intermediacy of ammonia acting in the presence of an oxidizing agent and a catalyst.

16. The process of recovering sulphur from sulphur bearing mineral oil, which comprises, effecting the removal of sulphur from said oil in the form of an ammonia-sulphur compound through the intermediacy of ammonia acting in the presence of an alkalinous metal.

In testimony whereof I have affixed my signature, in the presence of two witnesses.

JOHN COLLINS CLANCY.

Witnesses:
HOWARD C. RIPLEY,
HELEN M. BARNBROOK.